INVENTOR.
RALPH E. ABBOTT
BY John F. Luhrs
ATTORNEY

United States Patent Office 3,480,476
Patented Nov. 25, 1969

3,480,476
CONTROL SYSTEM FOR SUGAR
INVERSION PROCESS
Ralph E. Abbott, San Francisco, Calif., assignor to
Bailey Meter Company, a corporation of Delaware
Filed Oct. 17, 1966, Ser. No. 587,027
Int. Cl. C13k *3/00*
U.S. Cl. 127—1
8 Claims

ABSTRACT OF THE DISCLOSURE

An apparatus for and method of sequentially controlling a batch process for the inversion of sugar. The system compensates for the effect of ambient temperature conditions existing prior to initiating the inversion process while also compensating for the exothermic reaction heat which is lost from a vat, containing the batch, to the ambient environment during the process operation. The means of compensating for the ambient temperature conditions includes a servo follower unit which provides a reverse polarity memory, and the means for compensating for the lost reaction heat includes an integral unit producing a ramp output signal representing total heat lost during the inversion process.

This invention relates to apparatus for automatic sequential control of a batch process and more particularly to the control of a sugar inversion process.

The process involves the addition of hydrochloric acid to a slurry of granulated sugar in water and the resulting inversion is the hydrolysis of disaccharide sugar into monosaccharide sugar. The chemical equation for this inversion process being:

$$C_{12}H_{22}O_{11}+H_2O \rightarrow 2C_6H_{12}O_6$$

The sugar inversion process results in a sucrose solution for use in the canning industry. The percent invert solution desired varies thereby requiring a means to preset the control of the process for the desired percent of invert. Failure to precisely control the process results in an off-standard product and in undue waste and delay.

My control system employs a novel combination of circuitry components resulting in a precise sequential control of the sugar inversion process by providing a means of sensitive, accurate monitoring of heat generated by the exothermic reaction. Total increase in system temperature from the reaction is only about 5° C. The control system embodying my invention will accurately control the inversion process over this narrow temperature span.

The signal output of a thermistor, which monitors the temperature in the process vat is a variable input to the system. The system compensates for both the effect of ambient temperature conditions existing prior to initiating the inversion process and also compensates for the exothermic reaction heat which is lost from the vat to the ambient environment during the process operation. The system thereby precisely calculates the heat generated by the exothermic inversion process and is the means used to control the addition of reactants to initiate and terminate the process such that a pre-selected percent invert solution will result.

It is therefore an object of my invention to provide a control to produce a sugar invert solution of a preselected percent invert including control of the necessary reactants to initiate the process, monitoring the reaction, adding necessary reactants to terminate the process, transferring the solution to a storage vat and resetting the process for a subsequent cycle.

Other objects and advantages will become apparent from the following description and drawings, wherein.

Figure 1:
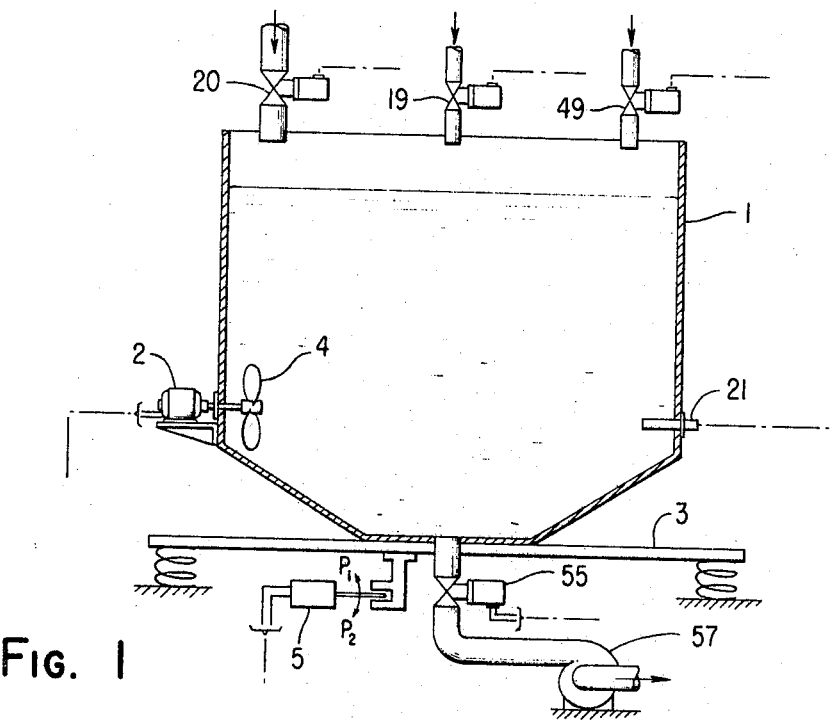
FIG. 1 is a schematic illustration of a sugar inversion process vat with associated valves and piping.

Referring to FIG. 1, I show a sugar process vat 1, the construction of which is well known to those skilled in the art. In operation, the slurry of granulated sugar in water enters the vat 1 through a solenoid valve 20.

The slurry level in the vat 1 is a function of the weight of slurry in the vat. As shown, the vat 1 is mounted on a scale 3 and when the vat 1 (tare weight) plus slurry weight equals a desired value usually corresponding to a desired level, the contact of a differential switch 5 moves from position $P_1$ to position $P_2$, causing the solenoid valve 20 to deenergize and shut off the flow of slurry into the vat. The contact of switch 5 (FIG. 3) when in position $P_2$ energizes a solenoid switch B closing normally open contacts $B_1$ and $B_2$. Closure of contacts $B_1$ energizes an agitator motor 2 which rotates agitator 4 continuously until the solution is transferred from the vat.

The flow of sugar slurry to vat 1 is started by momentarily pressing the normally open start button 8 which energizes a solenoid relay A having normally open contacts $A_1$ and $A_2$. Closure of contacts $A_2$ energizes the solenoid valve 20. Closure of contacts $A_1$ maintains the solenoid A energized after release of the start button 8. When the desired weight or level of slurry is attained, switch 5 moves from position $P_1$ causing deenergization of solenoid A and closure of valve 20 thereby stopping the flow of sugar slurry.

The sugar inversion process is an exothermal process and the heat generated by the process which is a function of the reaction time is directly related to the percent invert produced in the vat solution. It is, therefore, necessary to monitor the heat generated by the process by comparing the corresponding temperature rise as a signal to a signal limit which corresponds to the desired percent invert.

Figure 2:
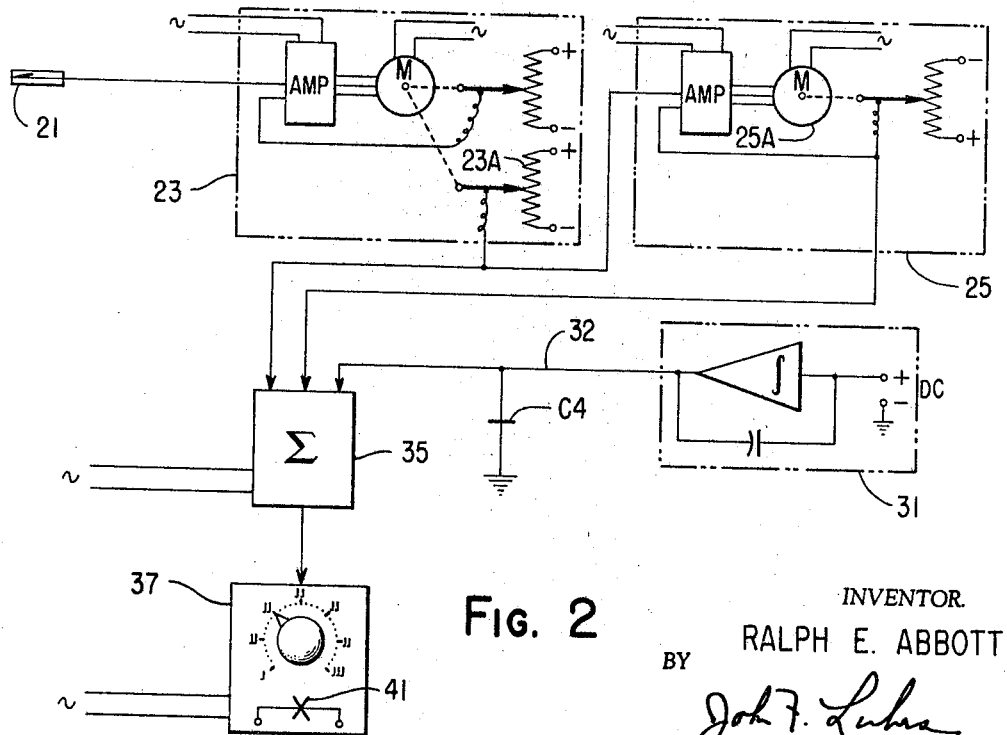
FIG. 2 is a schematic illustration of my control system.

The desired quantity of sugar slurry having been transferred to the process vat 1, FIG. 2 schematically illustrates the control function of the computer system. The thermistor 21 mounted in the vat 1 monitors the temperature of the vat solution. The thermistor provides rapid speed of response and a high output change per degree of temperature change. These characteristics are essential since the temperature span of the inversion process is about 5° C. The output of the thermistor 21 serves as an input to an electronic recorder 23.

The inversion process is initiated after the vat has been initially heated to a temperature between 80° C. and 85° C.; therefore, since the maximum temperature rise caused by the inversion process is 5° C., the recorder 23 is preferably calibrated for a range of about 80° C. to 90° C. to insure maximum resolution and accuracy. The electronic recorder 23 generates a D-C voltage output at retransmitting slidewire 23A which is proportional to the vat temperature. The output of the retransmitting slidewire 23A is an input to a summer unit 35.

To precisely measure the heat generated by the inversion process, it is necessary to not only measure the temperature rise of the vat solution, but it is also necessary to subtract the vat solution temperature which existed just prior to the initiation of the process and to add to the temperature rise, an amount which is proportional to the heat loss from the vat to the ambient environment during the process. This compensation is provided by a servo follower unit 25 and the integral unit 31 respectively. The D-C signal from the transmitting slidewire 23A, which is proportional to vat temperature, serves as an output to the servo follower unit 25 as well as to the summer unit 35. The servo follower unit 25 operates to produce a D-C signal which is equal in magnitude but of opposite polarity to the D-C signal from the recorder 23.

The servo follower 25 output serves as an input to the summer unit 35. Thus any increase in output voltage of 23A is matched by an equal voltage of opposite polarity from the servo follower 25. This produces a zero voltage output from the summer 35 as long as the servo follower 25 is permitted to follow the output of the retransmitting slidewire 23A.

To compensate for the heat loss from the vat during a reaction cycle, a function is generated to approximate the heat loss to ambient by using the integral unit 31 as a ramp generator. The integral setting is experimentally determined. The output of the integral unit serves as a third input to the summer 35 through a connection 32. Prior to the start of the inversion process, the connection 32 of the integral unit 31 to the summer 35 is grounded through contacts $C_4$ of a solenoid relay C. This signal ground prevents a signal from passing from the integral unit 31 to the summer 35. The output of the summer unit serves as the input to a signal monitor 37 which in turn compares the D-C signal from the summer 35 to an adjustable preset limit which represents the desired percent invert.

Figure 3:
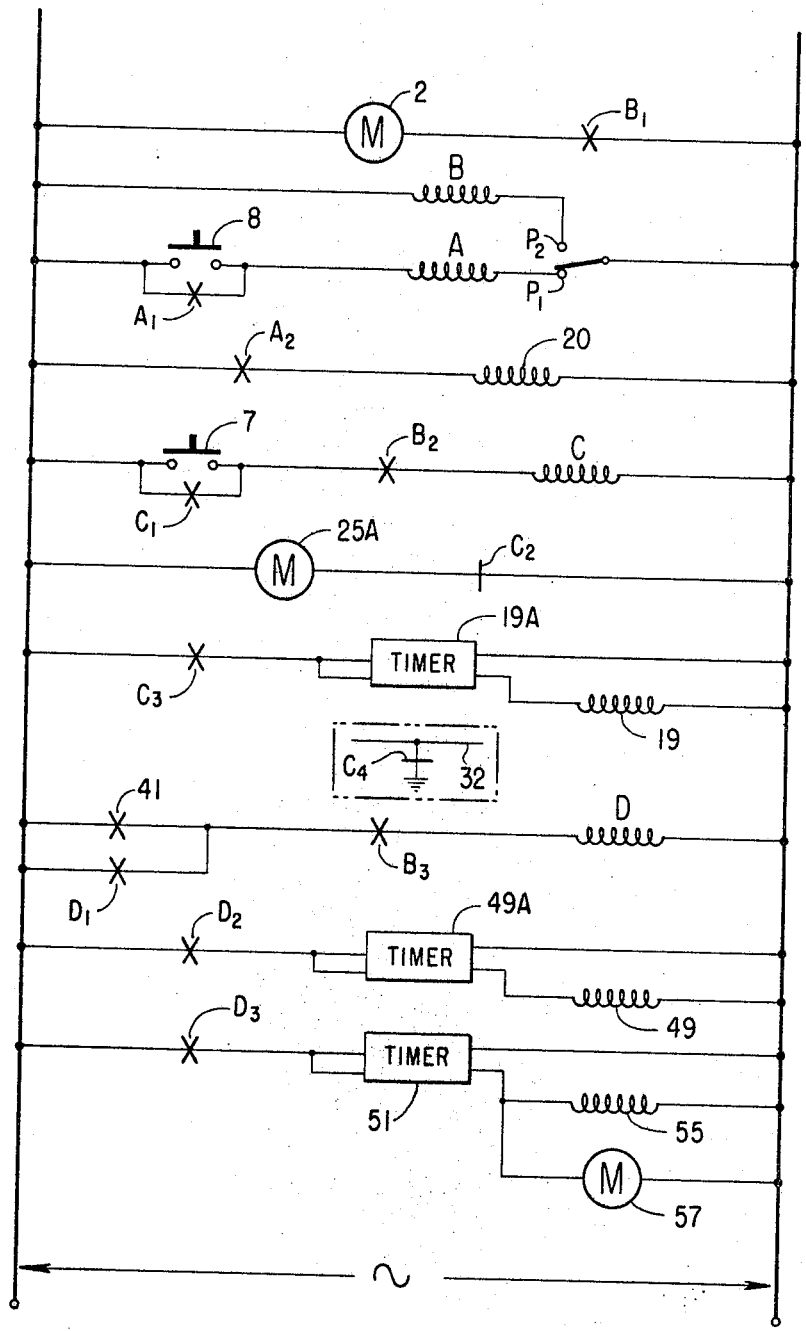
FIG. 3 is an across-the-line schematic wiring diagram of my control system.

The inversion process is initiated by pressing the start button 7 as illustrated in FIG. 3. The level in the vat having been attained, the vat level sensor 5 permits solenoid C to energize, closing normally open contacts $C_1$, $C_3$ and opening normally closed contacts $C_2$ and $C_4$. The relay contacts $C_1$ hold in the start circuit. Relay contacts $C_3$ energize a timer 19A which in turn energizes solenoid valve 19 to permit acid to flow into the vat for a predetermined period and hence introduce into the vat a measured quantity of acid. Relay contacts $C_2$ de-energize the reversing motor 25A in servo follower 25 and hence the output therefrom remains constant during the reaction process. Relay contacts $C_4$ open the ground in the output of integrating unit 31 thereby impressing a ramp voltage on summer 35 proportional to the heat lost to ambient during the reaction process.

The servo follower motor circuit having been broken, the output of the servo follower 25 remains constant at the value existing at the instant the inversion process was initiated. Therefore, the resultant signal from the retransmitting slidewire 23A and the servo follower 25 to the summer 35 after the process is initiated reflects only the vat temperature rise caused by the exothermal inversion process. This is so because the ambient start point temperature has been subtracted by means of the servo follower 25 output.

The relay contacts $C_4$ which had grounded the summing point of the integral unit 31 are opened by the energizing of solenoid C. Therefore, the integral unit 31 slowly begins to integrate in a positive directon to generate a functon representing reaction heat loss to ambient. This integrating signal serves as an input to the summer 35 through the connector 32.

The output of the summer 35 is equal to the temperature increase of the vat solution from the time the acid was added to initiate the process plus the temperature increase that would have occurred had not reaction heat been lost to the ambient environment.

The summer 35 output is a voltage representation of the temperature rise due to the exothermic reaction of the sugar inversion process. The greater the temperature rise, the greater the voltage output of the summer 35 and the higher the percentage of invert produced.

The summer 35 output is the input to the signal monitor 37. The input is compared with a preselected adjustable reference voltage which represents the percent invert desired.

Therefore, control of the percent invert of the solution is a direct function of the selected setting of the adjustable reference voltage of the signal monitor 37. When the signal from the summer 35 into the signal monitor 37 equals the reference voltage setting of the signal monitor, an internal relay is energized within the signal monitor closing contacts 41.

Closure of contacts 41 energizes a solenoid D causing closure of contacts $D_1$, $D_2$ and $D_3$. Contacts $D_1$ maintain the solenoid D energized after contact 41 opens due to a decrease in the signal from the summer 35 after the completion of the inversion process. Contacts $D_2$ initiates energization of a timer 49A which in turn causes energization of solenoid valve 49 for a timed period thus introducing a known quantity of neutralizer, such as calcium hydroxide, into the vat 1 and stopping the inversion process. Closure of contacts $D_3$ energizes time delay relay 51, which after the timed period of solenoid valve 49 energizes dump solenoid valve 55 and simultaneously energizes pump 57 to empty the vat 1.

The weight of the process vat having been returned to tare as a result of the transfer of the invert solution, the vat level sensor 5 contact returns to the $P_1$ position thereby resetting the system to start configuration.

What I claim as my invention is:

1. A control system for a sugar inversion process, comprising in combination, means to activate the system, means generating a signal proportional to the temperature of the solution in a process vat, a servo follower unit responsive to the signal generated by said generating means and producing a constant output signal during the inversion reaction cycle, which signal is equal in magnitude to that put out by said generating means at the instant the inversion reaction cycle is initiated but of opposite polarity, an integral unit producing a ramp output signal representing total heat loss from the vat during the reaction cycle, a summer unit which accepts the signals of said signal generating means, the servo follower unit and the integral unit and produces a resultant output signal representing the total heat generated by the sugar inversion process, an adjustatble setpoint signal generator which accepts the output signal of the summer and terminates the inversion process when the summer output signal corresponds to the setpoint signal to achieve the selected percent invert and means for sequentially controlling all the above said means.

2. The combination of claim 1 further characterized by the provision of means to select any desired percent invert solution by rotating a selector dial on an adjustment setpoint signal generator.

3. The combination of claim 1 further characterized by the provision of means to select the ramp output signal from said integral unit to match the rate of heat loss from the vat determined experimentally for the particular process and vat in question.

4. A control system for a sugar inversion process as claimed in claim 1 wherein said sequentially controlling means includes a series of electrical relay contacts which allow a subsequent cycle of the inversion process when the present cycle is complete.

5. In a control system for a batch process in a vat, comprising in combination: means for introducing a preselected volume of a process solution into the vat; means for generating a first signal proportional to the temperature of the process solution in the vat; means for introducing a preselected volume of a catalyst solution into the process solution to initiate a reaction process; the improvement comprising:

means, responsive to said signal generating means, for providing a reverse polarized signal having a magnitude equal to said first signal at the instant the catalyst solution is introduced into the process solution, said reverse polarized signal remaining constant during said reaction process;

means for generating a ramp signal substantially proportional to the reaction heat lost from the vat to the ambient environment during the reaction process; and, means for continuously summing the first signal, the reverse polarized signal and the ramp signal during the entire reaction process to provide an output signal proportional to the heat generated during the reaction process.

6. The control system of claim 5, wherein the improvement further comprises: means for comparing an adjustable setpoint singal with the output signal from said summing means; and means, responsive to said comparing mean, for terminating the reaction process when said output signals are equal to obtain a preselected reaction process solution.

7. The method of sequentially controlling a batch process in a vat which comprises the steps of:
  (a) generating a first signal proportional to the temperature of the process solution in the vat;
  (b) introducing a preselected volume of a catalyst solution into the process solution to initiate a reaction process;
  (c) generating a second signal of opposite polarity to the first signal and with a magnitude equal thereto at the instant the catalyst solution is introduced into the process solution, said second signal remaining constant during the reaction process;
  (d) generating a ramp singal substantially proportional to the reaction heat lost from the vat to the ambient environment during the reaction process;
  (e) summing the three signals during the reaction process;
  (f) comparing said sum of signals with an adjustable setpoint signal; and,
  (g) terminating the reaction process when said sum of signals is equal to the setpoint signal to obtain a preselected reaction process solution.

8. The method of claim 7, wherein the batch process is for the inversion of sugar by the hydrolysis of disaccharide sugar into monosaccharide sugar and the reaction process is terminated by adding a pre-selected amount of calcium hydroxide.

References Cited

UNITED STATES PATENTS 1,886,875 11/1932 Ehrhart et al. _____ 127—41
2,701,210 2/1955 Fisher et al. _____ 23—230 XR

OTHER REFERENCES

Deerr, "Cane Sugar," 2nd ed. (1921), pp. 260–262.
Honig, "Principles of Sugar Technology" (1953), pp. 467–476.

MORRIS O. WOLK, Primary Examiner

R. E. SERWIN, Assistant Examiner

U.S. Cl. X.R.

23—230, 253; 127—41; 260—698

Disclaimer and Dedication

3,480,476.—*Ralph E. Abbott*, San Francisco, Calif. CONTROL SYSTEM FOR SUGAR INVERSION PROCESS. Patent dated Nov. 25, 1969. Disclaimer and dedication filed July 21, 1970, by the assignee, *Bailey Meter Company*.

Hereby disclaims the remaining term of said patent and dedicates said patent to the Public.

[*Official Gazette November 10, 1970.*]